(12) United States Patent
Boileau

(10) Patent No.: US 10,689,125 B2
(45) Date of Patent: Jun. 23, 2020

(54) NACELLE FOR AN AIRCRAFT TURBOJET ENGINE WITH HYBRID AIR INLET AND FAN COWL

(71) Applicant: Safran Nacelles, Gonfreville l'Orcher (FR)

(72) Inventor: Patrick Boileau, Gonfreville l'Orcher (FR)

(73) Assignee: Safran Nacelles, Gonfreville l'Orcher (FR)

( * ) Notice: Subject to any disclaimer, the term of this patent is extended or adjusted under 35 U.S.C. 154(b) by 0 days.

(21) Appl. No.: 16/288,286

(22) Filed: Feb. 28, 2019

(65) Prior Publication Data

US 2019/0193865 A1 Jun. 27, 2019

Related U.S. Application Data

(63) Continuation of application No. PCT/FR2017/052294, filed on Aug. 29, 2017.

(30) Foreign Application Priority Data

Aug. 30, 2016 (FR) ...................................... 16 58027

(51) Int. Cl.
*B64D 29/06* (2006.01)
*B64D 29/08* (2006.01)

(52) U.S. Cl.
CPC ............. *B64D 29/06* (2013.01); *B64D 29/08* (2013.01)

(58) Field of Classification Search
CPC ................................ B64D 29/06; B64D 29/08
See application file for complete search history.

(56) References Cited

U.S. PATENT DOCUMENTS

| 2,494,347 A | 1/1950 | Matthews |
| 5,941,061 A * | 8/1999 | Sherry .................. B64D 29/08 244/54 |
| 5,974,783 A | 11/1999 | Gonidec et al. |

FOREIGN PATENT DOCUMENTS

EP 2631181 8/2013

OTHER PUBLICATIONS

International Search Report for International Application PCT/US2017/052294, dated Oct. 26, 2017.

* cited by examiner

*Primary Examiner* — Brian M O'Hara
*Assistant Examiner* — Michael B. Kreiner
(74) *Attorney, Agent, or Firm* — Burris Law, PLLC

(57) ABSTRACT

The present disclosure relates to a nacelle for an aircraft turbojet engine that includes an air inlet having a leading edge of the nacelle extending forward by an inner wall and an outer wall of the air inlet and a fan cowling defining, in a closed position, aerodynamic continuity with the outer wall of the nacelle, intended for surrounding a turbojet engine fan cowling. The air inlet is designed to define at least one portion of the fan cowling. The present disclosure also relates to a propulsion assembly that includes a nacelle surrounding a turbojet engine.

8 Claims, 3 Drawing Sheets

NACELLE FOR AN AIRCRAFT TURBOJET ENGINE WITH HYBRID AIR INLET AND FAN COWL

CROSS-REFERENCE TO RELATED APPLICATIONS

This application is a continuation of International Application No. PCT/FR2017/052294, filed on Aug. 29, 2017, which claims priority to and the benefit of FR 16/58027 filed on Aug. 30, 2016. The disclosures of the above applications are incorporated herein by reference.

FIELD

The present disclosure relates to a nacelle for an aircraft turbojet engine and to a propulsion unit comprising such a nacelle, surrounding a turbojet engine.

BACKGROUND

The statements in this section merely provide background information related to the present disclosure and may not constitute prior art.

An aircraft is propelled by several propulsion units each comprising a turbojet engine housed in a nacelle also accommodating a set of auxiliary actuating devices linked to its operation and providing various functions when the turbojet engine is in operation or at stop, such as for example, a thrust reverser system.

A known propulsion unit 1 is shown in FIG. 1 in isometric view and in a maintenance position.

The propulsion unit 1 comprises a nacelle 3 and a turbojet engine 5. The nacelle 1 generally has a tubular structure comprising an air inlet 7 upstream of the engine, a median section intended to surround a fan of the turbojet engine, and a downstream section intended to surround the combustion chamber of the turbojet engine and accommodating a thrust reverser device.

The thrust reverser device is, during landing of the aircraft, intended to improve the braking capacity thereof by redirecting forward at least part of the thrust generated by the turbojet engine. The thrust reverser device comprises in particular movable cowls 9 displaceable between, on the one hand, a deployed position in which they open in the nacelle a passage intended for the diverted flow, and on the other hand, a retraction position in which they close this passage.

The fan of the turbojet engine is essentially composed of a rotary shaft carrying a plurality of blades. At their radial end, the blades are circumferentially surrounded by a fan casing 11.

The nacelle 3 includes downstream of the air inlet 7 two fan half-cowls 13a, 13b surrounding the fan casing 11 of the turbojet engine 5. Each fan half-cowl 13a, 13b is substantially semicylindrical, and define in a closed position (not shown) an aerodynamic continuity with an outer wall 15 of the nacelle 3 air inlet 7. In this closing position, the fan half-cowls 13a, 13b are locked on a fixed structure or with one another by a set of locks, along a lower longitudinal locking line in the case of an under-wing powerplant.

As shown in FIG. 1, the fan half-cowls 13a, 13b can be radially opened by pivoting about an upper longitudinal hinge line located in the proximity of an axis of a mast 17 to which the nacelle 5 is fastened, in order to allow access to certain components of the fan casing 11 during maintenance operations. In certain types of engines, the set of elements to be maintained is located only at the high-pressure zone of the engine ("core" volume). The maintenance operations are then concentrated at this zone of the engine.

The fan half-cowls 13a, 13b are opened thanks to at least one actuator, for example a cylinder 19, and are held in the open position thanks to at least one rod 21, the actuator and the rod each having a first end generally fixed on the fan casing 11 of the turbojet engine 5, and a second end fixed on the half cowl. In a known manner, the actuators can be produced in the form of hydraulic actuators.

In such a propulsion unit of the prior art, it was found first of all that the presence of the fan half-cowls causes a decrease in the laminar profile of the outer wall of the nacelle in contact with the outer air flow, resulting in parasitic drags.

Then, the actuators and the rods that constitute the system for opening and holding the fan half-cowls in the open maintenance position have a large mass, which weighs down the nacelle and which also consequently reduces its aerodynamic performances.

SUMMARY

The present disclosure provides an aircraft turbojet engine nacelle that has a reduced mass and drag, in order to improve its aerodynamic performances.

To this end, the present disclosure concerns a nacelle for an aircraft turbojet engine, the nacelle comprising:

an air inlet comprising a leading edge of the nacelle extended downstream by an inner wall and by an outer wall of the air inlet; and a fan cowl defining, in a closed position, an aerodynamic continuity with the outer wall of the nacelle intended to surround a fan casing of a turbojet engine, said nacelle being remarkable in that the air inlet is designed to define at least one portion of the fan cowl.

Thus, by providing a nacelle whose air inlet is designed to define at least one portion of the fan cowl, the area of the "smooth" part of the outer wall of the nacelle is increased relative to the prior art. Thus, the laminarity, or the ability to provide laminar flow, of the outer wall of the nacelle is increased relative to the prior art, which allows reducing the surface flaws of the outer wall of the nacelle.

In addition, by providing an air inlet designed to define at least one portion of the fan cowl, the area of the fan cowls is decreased relative to the prior art. This allows reducing by about half the mass of the opening systems of these fan cowls. Alternatively, the opening of the fan cowls can also be performed manually.

It is thus made possible thanks to the present disclosure to provide fan cowls of a greatly reduced dimension relative to that of the prior art, these cowls being mounted, in one form, on nacelles supporting an engine for which the maintenance operations are concentrated at the high-pressure zone of the engine ("core" volume). In other words, the nacelle of the present disclosure is mainly intended to be mounted on engines whose set of elements to be maintained is located at the high-pressure zone of the engine.

According to optional characteristics of the nacelle according to the present disclosure:

the fan cowl comprises two fan half-cowls extending over a circumferential portion of the nacelle comprised between about 145° and about 250°; or the fan half-cowls extend over a circumferential portion of the nacelle equal to about 180°. The components of the fan casing to which the operators regularly access during maintenance operations are typically cases located in a fairly aggregated manner on the fan casing. Thus, by providing a nacelle whose fan half-cowls extend only over a circumferential portion of the nacelle equal to about 180°, access to these cases can be provided by judiciously positioning the fan half-cowls in the nacelle. The mass of the half-cowls according to the present disclosure is thus reduced relative to the prior art, which allows dispensing with the devices for opening and holding these half-cowls in the open position, constituted as previously seen by a set of cylinders, locks, hinges and holding rods, which weigh down the nacelle.

According to further optional characteristics of the nacelle of the present disclosure:

the two fan half-cowls are removable or articulated relative to a top beam of the nacelle; and/or the nacelle comprises a thrust reverser device, downstream of the fan cowl, and the outer wall of the part of the nacelle air inlet which is designed to define at least one portion of the fan cowl extends to a front frame of said thrust reverser device. This advantageously allows increasing the area of the "smooth" part of the outer wall of the nacelle, and consequently increasing the laminarity of the outer wall of the nacelle in contact with the air flow flowing outside the nacelle.

The thrust reverser device may be the type with cascades, mounted translating along a longitudinal axis of the nacelle.

The present disclosure also concerns a propulsion unit for an aircraft, comprising:

a turbojet engine, comprising a fan casing surrounding a fan of said turbojet engine; and a nacelle according to the present disclosure, surrounding said turbojet engine, said propulsion unit being remarkable in that the inner wall of the nacelle air inlet and the fan casing of the turbojet engine comprises a complementary fixing device of the knife/groove type; at least at the part of the nacelle air inlet which is designed to define at least one portion of the fan cowl.

Providing a fixation between the air inlet and the fan casing thanks to fixing device of the knife/groove type, at least at the part of the nacelle inlet which is designed to define at least one portion of the fan cowl, allows good mechanical strength to the longitudinal forces while allowing easy radial clearance.

According to optional characteristics of this propulsion unit:

an upstream edge of the fan casing comprises a fixing flange adapted for fixing a downstream edge of the inner wall of the air inlet;

the propulsion unit comprises at least two locking devices arranged so as to provide a fixation between the complementary fixing device of the knife/groove type and the fixing flange of the fan casing.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
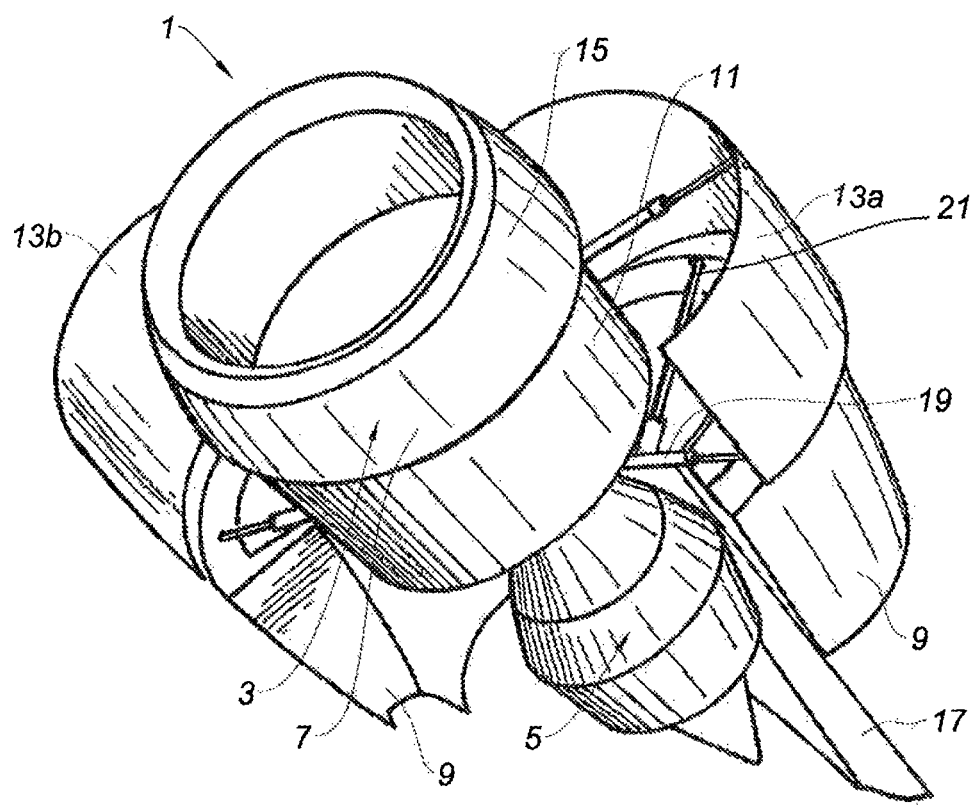
FIG. 1 is an isometric view illustrating a propulsive unit according to the prior art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Note that in the description and in the claims, the terms "upstream" and "downstream" should be understood relative to the circulation of the air flow inside the propulsion unit formed by the nacelle and the turbojet engine, that is to say from left to right with reference to FIG. 1.

Similarly, the terms "inner" and "outer" should be used in a non-limiting manner with reference to the radial distancing relative to the longitudinal axis of the nacelle, the expression "inner" defining a zone radially closer to the longitudinal axis of the nacelle, as opposed to the term "outer."

Furthermore, on all the figures, identical or similar references represent identical or similar members or sets of members.

Figure 2:
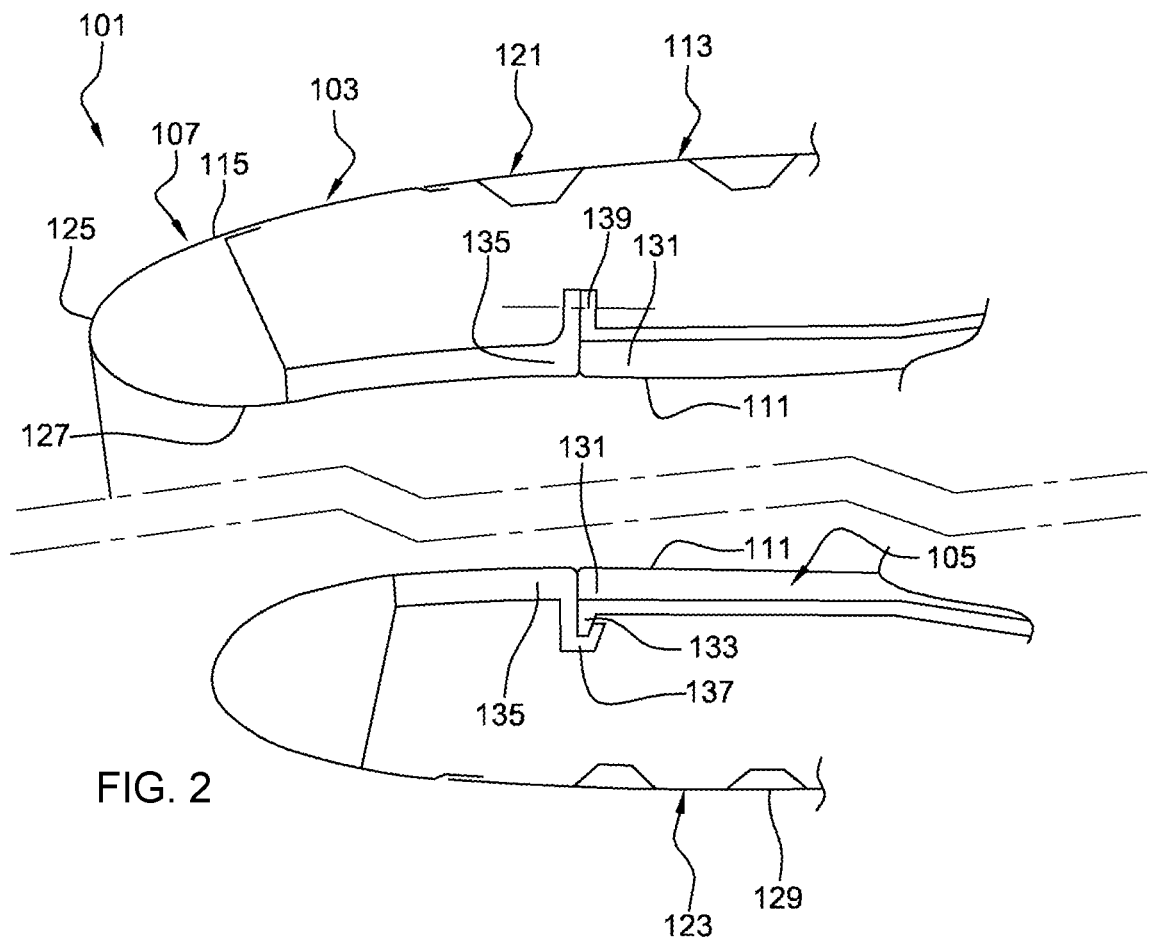
FIG. 2 shows, in a longitudinal section, the upper part and the lower part of the nacelle attached to a fan casing of the turbojet engine according to the present disclosure.

Reference is made to FIG. 2 illustrating in a longitudinal section the upper part 121 and the lower part 123 of the nacelle 103 according to the present disclosure, mounted on a fan casing 111 of a turbojet engine 105.

The nacelle 103 comprises an air inlet 107 upstream of the turbojet engine 105, whose fan casing 111 is visible. The air inlet 107 comprises a leading edge 125, extended downstream by an inner wall 127 and by an outer wall 115 intended to come into contact with the outer air flow flowing around the nacelle 103.

The nacelle 103 includes, downstream of the air inlet 107, a fan cowl 113 which surrounds the fan casing 111 of the turbojet engine. In a position called "closed" position shown in FIG. 1, the fan cowl 113 defines an aerodynamic continuity with the outer wall 115 of the nacelle.

According to the present disclosure, the air inlet 107 of the nacelle defines a portion 129 of the fan cowl 113.

Figure 3:
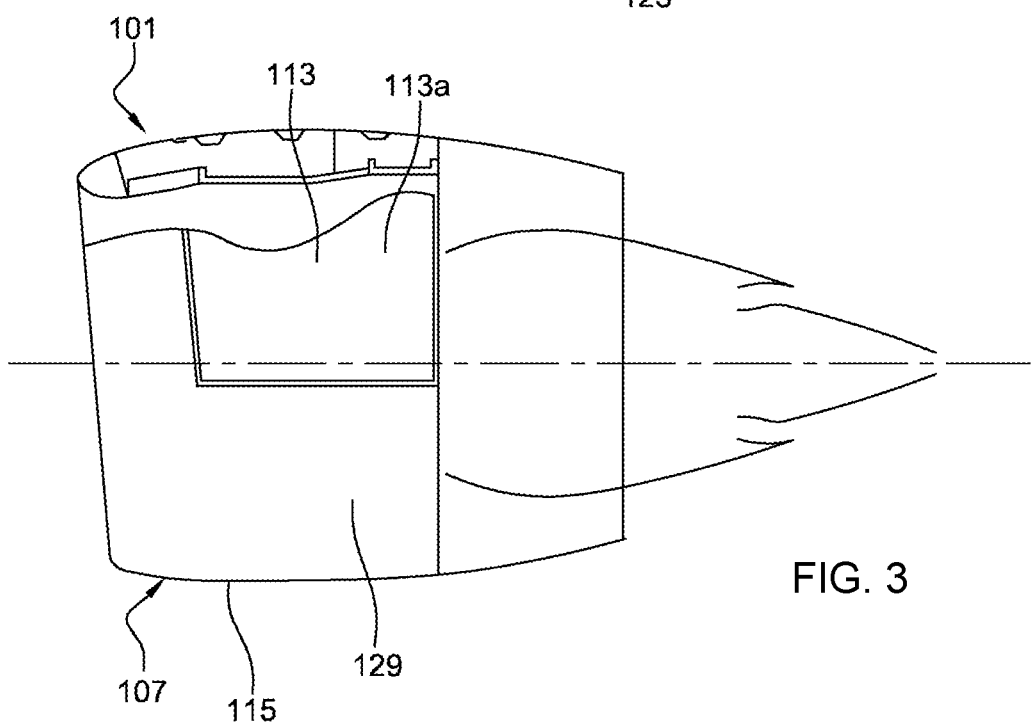
FIG. 3 is a side view of the propulsion unit according to a first form of the present disclosure.

In other words, and as is better understood thanks to FIG. 3 showing the propulsion unit 101 of the present disclosure in a side view, the outer wall 115 of the air inlet 107 of the nacelle includes an extension downstream of the nacelle, this extension being defined by the portion 129 of the air inlet surrounding the fan casing of the turbojet engine.

The outer wall of the air inlet part 107 which is designed to define the portion 129 of the fan cowl extends for example to a front frame (not shown) supporting the cascade vanes of a thrust reverser device.

Thanks to the extension of the outer wall of the air inlet to the front frame which supports the cascade vanes of the thrust reverser device, the area of the "smooth" part of the outer wall of the nacelle, that is to say the part of the outer wall of the nacelle which defines a portion of the fan cowl, is increased relative to that of the prior art, which allows increasing, relative to the prior art, the laminarity of the outer wall of the nacelle in contact with the air flow flowing outside the nacelle.

Note that the thrust reverser device that is envisaged to be used may be a cascade thrust reverser. In one form, the cascades of the thrust reverser device are cascades mounted translating along the longitudinal axis of the nacelle.

The fan cowl 113 of the present disclosure includes two fan half-cowls 113a, 113b (only the fan half-cowl 113a is visible in FIG. 3). These two half-cowls can be positioned on a localized portion of the nacelle, which is not necessarily a portion according to which the half-cowls are symmetrically distributed relative to a longitudinal plane of the nacelle. However, by providing to symmetrically distribute the two half-cowls relative to a longitudinal plane of the nacelle, the aerodynamic drag is decreased relative to another positioning on the nacelle.

The two fan half-cowls 113a, 113b are positioned on the circumference of the nacelle. These two half-cowls extend over a circumferential portion of the nacelle comprised between about 145° and about 250°, which corresponds to a percentage of the circumference of the nacelle comprised between about 40% and about 80% of the total circumference of the nacelle.

In one form, the fan half-cowls 113a, 113b extend over a circumferential portion of the nacelle equal to about 180°, which corresponds to a percentage of the circumference of the nacelle equal to about 50% of the total circumference of the nacelle.

By providing two half-cowls 113a, 113b that extend over a circumferential portion of the nacelle comprised between about 145° and about 250°, the opening of these two half-cowls can be done manually, without resorting to an auxiliary device for opening and maintaining these cowls in the open position.

The two fan half-cowls 113a, 113b can be removably mounted on the nacelle, or they can be articulated relative to a top beam of the nacelle.

Alternatively, the fan cowl of the present disclosure may include a stationary half-cowl relative to the surrounding structure of the nacelle and a movable half-cowl. The stationary half-cowl can be held stationary on the air inlet of the nacelle. Movable half-cowl means a half-cowl arranged to be easily disassembled and reassembled when maintenance operations are completed, or else a half-cowl mounted articulated on the nacelle so as to allow access to the elements of the turbojet engine to be maintained.

Figure 4:
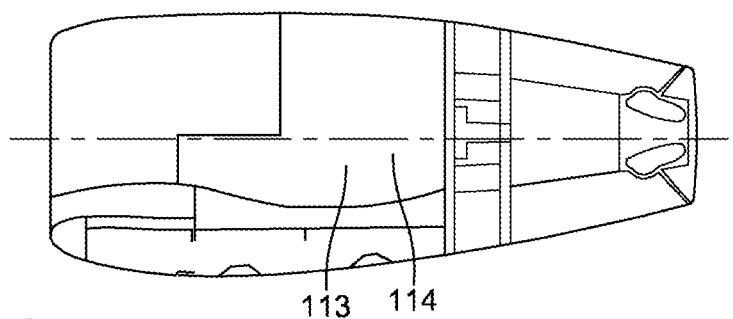
FIG. 4 is a side view of the propulsion unit according to a second form of the present disclosure.

According to another alternative shown in FIG. 4, the fan cowl 113 of the present disclosure may include a single movable cowl 114, which can be arranged to be easily disassembled then reassembled when the maintenance operations are completed, or can be mounted articulated on the nacelle so as to allow access to the elements of the turbojet engine to be maintained. This type of nacelle can be used in particular in a propulsion unit mounted at the rear of the aircraft fuselage, mounting often intended to equip business aircrafts.

Regardless of the retained type of mounting of the half-cowls on the nacelle, access to the zones of the fan casing 111 of the turbojet engine that support components such as cases is done by an operator who manually disassembles or manually opens the fan half-cowls.

Reference is made to FIGS. 2 to 4, in order to provide the mechanical holding of the air inlet 107 of the nacelle 103 on the fan casing 111 of the turbojet engine, the inner wall 127 of the air inlet and an upstream edge 131 of the fan casing 111 comprises a complementary fixing device of the knife/ groove type, at the part of the air inlet which defines the portion 129 of the fan cowl.

To this end, the upstream edge 131 of the fan casing is extended by a knife 133 carried by said upstream edge, while a downstream edge 135 of the inner wall 127 of the air inlet 107 receives a peripheral groove 137, extending over the entire circumference of the air inlet part which defines the portion 129 of the fan cowl.

The knife 133 is radially oriented from the inner wall 127 of the nacelle to the outer wall 115 of the nacelle. The knife 133 cooperates with the radial groove 137, of a complementary shape to that of the knife.

Generally, the groove 137 and the knife 133 each have a complementary V-shaped profile, the groove being commonly designated by the term "V-groove."

According to a variant, the mechanical holding of the air inlet 107 of the nacelle 103 on the fan casing 111 of the turbojet engine can be provided thanks to a set of pins, secured to the downstream edge 135 of the inner wall 127 of the nacelle and distributed over the entire circumference of the air inlet part which defines the portion 129 of the fan cowl, which engage a tangential flange secured to the upstream edge 131 of the fan casing 111.

On the portion of the fan casing intended to be surrounded by the fan cowls 113a, 113b, the upstream edge 131 of the casing comprises a fixing flange 139 adapted to fix the downstream edge 135 of the inner wall 127 of the air inlet 107.

Figure 5:
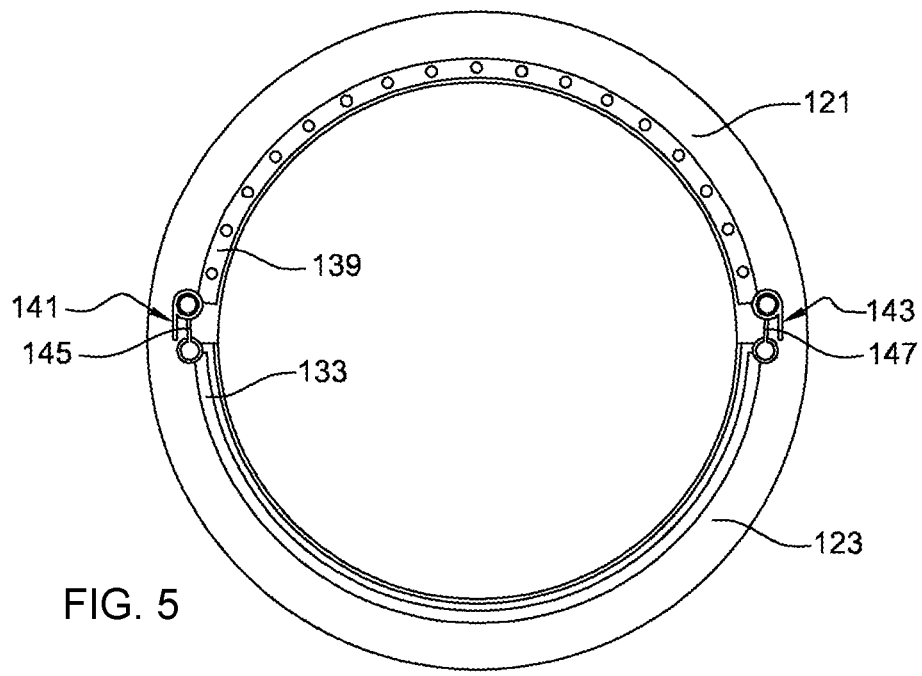
FIG. 5 illustrates a first form of the connection between the upper part and the lower part of the nacelle according to the present disclosure.

Reference is now made to FIG. 5 in which the nacelle of the present disclosure is schematically shown in a cross section.

In accordance with the present disclosure, it is envisaged to provide a fixing device 141, 143 of each side of the nacelle, for example in the "3 o'clock" and "9 o'clock" positions. These two locking devices 141, 143 are arranged to provide a fixation between the complementary fixing device of the knife 133/groove 137 type and the fixing flange 139 of the fan casing.

Fixing devices 141, 143 may for example be tensioners 145, 147 or turnbuckles, for keeping in tension the upper part 121 and the lower part 123 of the nacelle.

Figure 6:
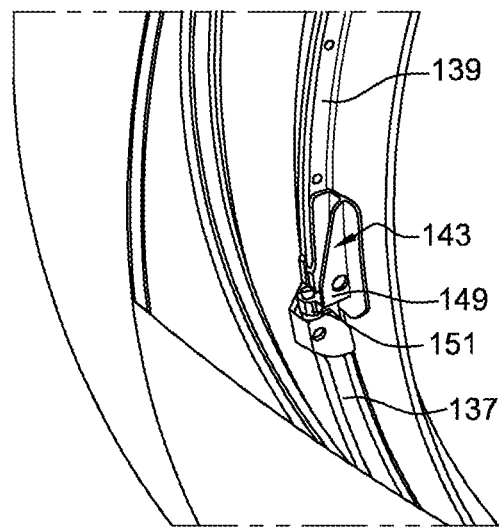
FIG. 6 illustrates a second form of the connection between the upper part and the lower part of the nacelle according to the present disclosure.

According to an alternative shown in FIG. 6, the fixing device 141, 143 (only the fixing device 143 is shown) comprises a screw flange 149 associated with a threaded tie rod 151 arranged to put a load in the knife 133/groove 137 assembly (only the groove 137 is visible in FIG. 6) so as to provide the proper positioning of the assembly.

It goes without saying that the present disclosure is not limited to the forms of this nacelle and of this propulsion unit, described above only by way of illustrative examples, but instead embraces all the variants involving the technical equivalents of the described means as well as their combinations if they fall within the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A nacelle for an aircraft turbojet engine, the nacelle comprising:
   an air inlet comprising a leading edge of the nacelle extending downstream by an inner wall and an outer wall of the air inlet; and
   a fan cowl, defining in a closed position an aerodynamic continuity with the outer wall of the nacelle, the fan cowl surrounding a fan casing of the aircraft turbojet engine, wherein the air inlet defines at least one portion of the fan cowl,
   wherein the fan cowl comprises two fan half-cowls together extending over a circumferential portion of the nacelle between 145° and 250°.

2. The nacelle according to claim 1, wherein the two fan half-cowls together extend over a circumferential portion of the nacelle equal to about 180°.

3. The nacelle according to claim 1, wherein the fan cowl includes two fan half-cowls that are removable or articulated relative to a top beam of the nacelle.

4. The nacelle according to claim 1 further comprising a thrust reverser device downstream of the fan cowl, wherein the outer wall of the air inlet defines at least one portion of the fan cowl and extends to a front frame of said thrust reverser device.

5. The nacelle according to claim 4, wherein the thrust reverser device includes cascades, mounted translating along a longitudinal axis of the nacelle.

6. A propulsion unit for an aircraft, the propulsion unit comprising:
   a turbojet engine comprising a fan casing surrounding a fan of said turbojet engine; and
   a nacelle according to claim 1 surrounding said turbojet engine, wherein the inner wall of the nacelle air inlet and the fan casing of the turbojet engine comprises a complementary fixing device including a knife and a groove disposed at least at a part of the nacelle air inlet that defines at least one portion of the fan cowl.

7. The propulsion unit according to claim 6, wherein an upstream edge of the fan casing comprises a fixing flange that fixes a downstream edge of the inner wall of the air inlet.

8. The propulsion unit according to claim 7 further comprising at least two locking devices arranged to provide a fixation between the complementary fixing device and the fixing flange of the fan casing.

* * * * *